(12) United States Patent
Liu et al.

(10) Patent No.: US 12,304,056 B1
(45) Date of Patent: May 20, 2025

(54) INTERNAL INSPECTION ROBOT

(71) Applicants: Electric Power Science & Research Institute of State Grid Tianjin Electric Power Company, Tianjin (CN); State Grid Tianjin Electric Power Company, Tianjin (CN); State Grid Corporation of China, Beijing (CN)

(72) Inventors: Liqing Liu, Tianjin (CN); Chun He, Tianjin (CN); Chi Zhang, Tianjin (CN); Songyuan Li, Tianjin (CN); Jufang Wei, Tianjin (CN); Junji Feng, Tianjin (CN); Chuang Yao, Tianjin (CN); Minghui Duan, Tianjin (CN); He Zhang, Tianjin (CN)

(73) Assignees: Electric Power Science & Research Institute of State Grid Tianjin Electric Power Company, Tianjin (CN); State Grid Tianjin Electric Power Company, Tianjin (CN); State Grid Corporation of China, Beijing (CN)

( * ) Notice: Subject to any disclaimer, the term of this patent is extended or adjusted under 35 U.S.C. 154(b) by 0 days.

(21) Appl. No.: 18/949,980

(22) Filed: Nov. 15, 2024

Related U.S. Application Data (63) Continuation of application No. PCT/CN2024/111406, filed on Aug. 12, 2024.

(30) Foreign Application Priority Data

Nov. 14, 2023 (CN) .......................... 202311509457.0

(51) Int. Cl.
*B25J 11/00* (2006.01)
*B25J 9/16* (2006.01)
(Continued)

(52) U.S. Cl.
CPC ........... *B25J 11/008* (2013.01); *B25J 9/1664* (2013.01); *B25J 19/0008* (2013.01); *B25J 19/023* (2013.01)

(58) Field of Classification Search
CPC .... B25J 11/008; B25J 9/1664; B25J 19/0008; B25J 19/023; G05D 1/048; B63G 8/001;
(Continued)

(56) References Cited

U.S. PATENT DOCUMENTS

| | | | |
|---|---|---|---|
| 4,947,782 A | 8/1990 | Takahashi | |
| 11,550,339 B2 * | 1/2023 | Cole | ...................... B63B 21/66 |

(Continued)

FOREIGN PATENT DOCUMENTS

| | | |
|---|---|---|
| CN | 103085952 A | 5/2013 |
| CN | 106428479 A | 2/2017 |

(Continued)

OTHER PUBLICATIONS

International Search Report and Written Opinion received for PCT Patent Application No. PCT/CN24/111406, mailed on Oct. 30, 2024, 9 pages (Original Copy Only).

*Primary Examiner* — Anthony D Wiest
(74) *Attorney, Agent, or Firm* — ArentFox Schiff LLP (57) ABSTRACT

An internal inspection robot includes a housing, a gravity balancing apparatus, a power apparatus, and multiple sensor apparatuses. The housing is configured to be a sealed structure including a first housing, a second housing, a third housing, a fourth housing, a fifth housing, and a sixth housing. The gravity balancing apparatus is disposed inside the housing and configured to control the pose of the internal inspection robot. The power apparatus and the multiple sensor apparatuses are disposed on the surface of the housing. The power apparatus is configured to receive a motion control signal from a control terminal to drive the internal (Continued)

inspection robot to move. The multiple sensor apparatuses are configured to provide a sensing signal to the control terminal.

9 Claims, 7 Drawing Sheets

(51) Int. Cl.
  *B25J 19/00* (2006.01)
  *B25J 19/02* (2006.01)
(58) Field of Classification Search
  CPC .... G01R 31/62; B63B 2207/02; G21C 17/013
  See application file for complete search history.

(56) References Cited

U.S. PATENT DOCUMENTS

| | | |
|---|---|---|
| 2015/0314845 A1 | 11/2015 | Yoshida et al. |
| 2015/0369751 A1 | 12/2015 | Cheim et al. |
| 2019/0325668 A1 | 10/2019 | Cole et al. |

FOREIGN PATENT DOCUMENTS

| | | | |
|---|---|---|---|
| CN | 110161336 A | 8/2019 | |
| CN | 210235292 U | 4/2020 | |
| CN | 111687825 A | 9/2020 | |
| CN | 111746767 A | 10/2020 | |
| CN | 212514960 U | 2/2021 | |
| CN | 113120152 A | 7/2021 | |
| CN | 114055495 A | 2/2022 | |
| CN | 215720873 U | 2/2022 | |
| CN | 114670998 A | 6/2022 | |
| CN | 115054181 A | 9/2022 | |
| CN | 115101310 A | 9/2022 | |
| CN | 117245677 A | 12/2023 | |
| JP | 02-216389 A | 8/1990 | |
| KR | 10-2012-0109956 A | 10/2012 | |
| KR | 10-1905584 B1 | 10/2018 | |
| RU | 2387571 C1 | 4/2010 | |
| WO | WO-2021028591 A1 * | 2/2021 | .............. F16L 55/30 |

* cited by examiner

INTERNAL INSPECTION ROBOT

CROSS-REFERENCES TO RELATED APPLICATIONS

This is a Continuation of International Patent Application No. PCT/CN2024/111406, filed on Aug. 12, 2024, which claims priority to Chinese patent application No. 202311509457.0 filed with China National Intellectual Property Administration (CNIPA) on Nov. 14, 2023, the disclosures of both of which are incorporated herein by reference in their entireties.

TECHNICAL FIELD

The present application relates to the field of transformer inspection technology, for example, an internal inspection robot.

BACKGROUND

In a power supply system, a large power transformer plays an important role in voltage conversion and energy transmission. The state of the large transformer is evaluated, and the operating condition of the transformer is mastered, so that a variety of preventive measures are implemented in advance to avoid the occurrence of major power accidents, which is of great significance to improve the safe and stable operation of a power system.

An oil-immersed transformer usually includes a sealed metal housing and a coil structure located inside the metal housing, and the metal housing is filled with transformer oil. As a result, the visibility inside the transformer is poor. In the case where the transformer is not disassembled, it is difficult to effectively and intuitively determine the internal insulation condition of the transformer through only the analysis of the dissolved gas in the oil. In the related art, the transformer oil is drained, and a manual inspection method is used to determine the internal insulation condition of the transformer. However, this method has problems such as low work efficiency, poor inspection accuracy, and high safety risks.

With the development of biomimetic robots and artificial intelligence technology, most current power systems use intelligent robots to inspect large transformers. However, in the process of implementing the concept of the present application, it is found that at least the following problems exist in the related art: The inspection robot disclosed by the related art generally has a large volume and an unreasonable physical structure, and such a robot has problems such as difficult control and poor stability during the internal inspection of a transformer.

SUMMARY

The present application provides an internal inspection robot. The internal inspection robot includes a housing, a gravity balancing apparatus, a power apparatus, and multiple sensor apparatuses. The housing is configured to be a sealed structure including a first housing and a second housing disposed opposite to each other, a third housing and a fourth housing disposed opposite to each other, and a fifth housing and a sixth housing disposed opposite to each other that are connected sequentially. The first housing and the second housing are each configured to be a rectangular housing. The third housing and the fourth housing are each configured to be a circular-arc housing. The fifth housing and the sixth housing are each configured to be an ellipse-like housing. The gravity balancing apparatus is disposed inside the housing and configured to control the pose of the internal inspection robot. The power apparatus and the multiple sensor apparatuses are disposed on the surface of the housing. The power apparatus is configured to receive a motion control signal from a control terminal to drive the internal inspection robot to move. A sensor apparatus of the multiple sensor apparatuses is configured to provide a sensing signal to the control terminal.

According to an embodiment of the present application, the gravity balancing apparatus includes a gravity adjustment chamber, a liquid level control unit of the gravity adjustment chamber, a gravity balancing hammer, and a pose control unit. The gravity adjustment chamber is configured to provide a cavity structure. The cavity structure is configured to store a liquid medium. The liquid medium is the protective medium inside a transformer. The liquid level control unit of the gravity adjustment chamber is configured to suck the liquid medium from the inside of the transformer and store the liquid medium in the cavity structure or is configured to discharge the liquid medium from the cavity structure to the inside of the transformer to control the gravity of the internal inspection robot. The pose control unit is configured to adjust the position of the gravity balancing hammer to control the pose of the internal inspection robot.

According to an embodiment of the present application, the gravity adjustment chamber includes an adjustment chamber housing and an adjustment chamber piston. The adjustment chamber piston includes a piston top and multiple piston connecting rods. Ends of the multiple piston connecting rods are configured to be connected to the piston top. The piston top and the adjustment chamber housing are sealed and connected to form the cavity structure.

According to an embodiment of the present application, the liquid level control unit of the gravity adjustment chamber includes multiple piston lifting assemblies, a liquid level control assembly, and a liquid level measurement assembly. Each of the multiple piston lifting assemblies is configured to be connected to the other end of a respective one of the multiple piston connecting rods. The liquid level measurement assembly of the adjustment chamber is configured to determine the liquid level information of the liquid medium stored in the cavity structure. The liquid level control assembly is configured to, according to the liquid level information, control the multiple piston lifting assemblies to drive the multiple piston connecting rods to move in a direction parallel to the piston connecting rods to adjust the position of the piston top, control the volume of the cavity structure, and suck or discharge the liquid medium.

According to an embodiment of the present application, the pose control unit includes a first mechanical arm drive joint, a first mechanical arm, a second mechanical arm drive joint, a second mechanical arm that are connected in sequence, a pose measurement assembly, and a pose control assembly. An end of the second mechanical arm facing away from the second mechanical arm drive joint is configured to be connected to the gravity balancing hammer. The pose measurement assembly is configured to determine the pose information of the internal inspection robot. The pose control assembly is configured to, according to the pose information, control rotation of the first mechanical arm drive joint and the second mechanical arm drive joint to drive the first mechanical arm and the second mechanical arm to move and adjust the position of the gravity balancing hammer to control the pose of the internal inspection robot.

According to an embodiment of the present application, the power apparatus includes a propulsion control unit and N power propulsion units, and N>2. At least two of the N power propulsion units are configured to be disposed on the first housing and the second housing respectively. At least one of the N power propulsion units is configured to be disposed on the fifth housing or the sixth housing. The propulsion control unit is configured to, according to the motion control signal, drive the at least one of the N power propulsion units to drive the internal inspection robot to move.

According to an embodiment of the present application, a power propulsion unit includes a sealed cabin, a propulsion motor, a bearing, a sealing member, a propeller, and a propeller guard ring. The propulsion motor is configured to be disposed in the sealed cabin. One end of the bearing is configured to be connected to the output terminal of the propulsion motor through the sealed cabin. The other end of the bearing is configured to be connected to the propeller. The sealing member is configured to be disposed at the connection between the bearing and the sealed cabin. The propeller guard ring is configured to be disposed around the propeller.

According to an embodiment of the present application, the multiple sensor apparatuses include a visual apparatus. The visual apparatus includes a light source and two camera units. The light source and the two camera units are configured to be disposed on the third housing or the fourth housing. The included angle between optic axes of the two camera units is configured to be 30 degrees.

According to an embodiment of the present application, the internal inspection robot also includes multiple biomimetic dorsal fin structures configured to be disposed on the fifth housing or the sixth housing. A biomimetic dorsal fin structure is provided with a wireless control antenna and a wireless video antenna. The wireless control antenna is configured to receive the motion control signal from the control terminal or send multiple sensing signals to the control terminal. The wireless video antenna is configured to send the control terminal an image captured by the camera units of the visual apparatus.

According to an embodiment of the present application, the multiple sensor apparatuses include a sounding apparatus, a positioning signal transmitting apparatus, and an infrared obstacle avoidance apparatus. The sounding apparatus is configured to be disposed on the fifth housing or the sixth housing and determine the sinking depth information of the internal inspection robot inside the transformer. The positioning signal transmitting apparatus is configured to be disposed on the fifth housing or the sixth housing and transmit a positioning signal according to a preset period to enable the positioning array in the transformer to obtain the position information of the internal inspection robot according to the received positioning signal. The infrared obstacle avoidance apparatus includes at least two infrared sensors configured to be disposed on the fifth housing and the sixth housing respectively. The infrared obstacle avoidance apparatus is configured to determine the distance information between the internal inspection robot and an obstacle inside the transformer.

REFERENCE LIST 1 housing
2 gravity balancing apparatus
3 power apparatus
4 visual apparatus
5 sounding apparatus
6 positioning signal transmitting apparatus
7 infrared obstacle avoidance apparatus
8 biomimetic dorsal fin structure
11 first housing
12 second housing
13 third housing
14 fourth housing
15 fifth housing
16 sixth housing
21 gravity adjustment chamber
22 liquid level control unit of the gravity adjustment chamber
23 gravity balancing hammer
24 pose control unit
211 adjustment chamber housing
212 adjustment chamber piston
2121 piston top
2122 piston connecting rod
221 piston lifting assembly
222 liquid level measurement assembly
241 first mechanical arm
242 first mechanical arm drive joint
243 second mechanical arm
244 second mechanical arm drive joint
245 pose measurement assembly
246 pose control assembly
2421 first drive motor
2422 first speed reducer
2423 first rotation axis angle measurement apparatus
2441 second drive motor
2442 second speed reducer
2443 second rotation axis angle measurement apparatus
31 propulsion control unit
32 power propulsion unit
321 first power propulsion unit
322 second power propulsion unit
323 third power propulsion unit
324 fourth power propulsion unit
41 first camera unit
42 second camera unit
43 light source

DETAILED DESCRIPTION

Embodiments of the present application are described hereinafter with reference to drawings. These descriptions are merely exemplary and are not intended to limit the scope of the present application. In the description below, for ease of explanation, many details are described to provide an understanding of embodiments of the present application. However, one or more embodiments may also be implemented without these details. In addition, in the description below, the description of well-known structures and technology are omitted to avoid unnecessary confusion about the concept of the present application.

Terms used herein are intended only to describe the embodiments and are not intended to limit the present application. The terms "comprising" and "including" used herein indicate the presence of stated features, steps, operations, and/or components without excluding the presence or addition of one or more other features, steps, operations, or components.

All terms used herein (including technical terms and scientific terms) have meanings the same as those commonly understood by those skilled in the art unless otherwise defined. The terms used herein should be interpreted as having meanings consistent with their meanings in the context of the specification and should not be interpreted in an idealized or overly rigid manner.

In the case where expressions such as "at least one of A, B, or C" are used, the expressions should generally be interpreted according to the meaning of the expression commonly understood by those skilled in the art (for example, "a system having at least one of A, B, or C" should include a system having A alone, a system having B alone, a system having C alone, a system having A and B, a system having A and C, a system having B and C, and/or a system having A, B, and C).

With the continuous penetration of cutting-edge technology such as big data, the Internet of things, and artificial intelligence, various industries have witnessed rapid development and also face increasing power supply requirements. In a power supply system, a large power transformer plays an important role in voltage conversion and energy transmission. The state of the large transformer is evaluated, and the operating condition of the transformer is mastered, so that a variety of preventive measures are implemented in advance to avoid the occurrence of major power accidents, which is of great significance to improve the safe and stable operation of a power system.

Large power transformers may be divided into oil-immersed transformers, dry-type transformers, and gas insulated transformers according to different insulation media. An oil-immersed transformer includes a coil, an iron core, and an oil tank. The coil and the iron core are enclosed in the oil tank, and the oil tank is full of mineral insulating oil to insulate, cool, and extinguish arcs in the coil.

However, since the metal housing of the oil-immersed transformer is filled with transformer oil, the visibility inside the oil-immersed transformer is poor. In the case where the transformer is not disassembled, it is difficult to effectively and intuitively determine the internal insulation condition of the transformer through only the analysis of the dissolved gas in the oil. The transformer oil is drained, and a manual inspection method is used, that is, maintenance personnel need to drill into the transformer body or inspect through a hanging cover to determine the internal insulation condition of the transformer. However, this method has problems such as low work efficiency, poor inspection accuracy, and high safety risks and requires a lot of manpower and material resources.

With the development of biomimetic robots and artificial intelligence technology, most current power systems use intelligent robots to inspect large transformers. The biomimetic robots are placed inside the transformer to directly observe the inside of the transformer, so that the position of an insulation defect and the degree of insulation deterioration can be effectively determined, thereby accurately troubleshooting the insulation defect inside the transformer.

However, in the process of implementing the concept of the present application, it is found that at least the following problems exist in the related art: The inspection robot disclosed by the related art generally has a large volume and an unreasonable physical structure, and such a robot has problems such as difficult control and poor stability during the internal inspection of a transformer.

In view of this, in embodiments of the present application, for an internal inspection robot, a first housing and a second housing are configured to be rectangular housings, a third housing and a fourth housing are configured to be circular-arc housings, a fifth housing and a sixth housing are configured to be ellipse-like housing, and the housings are sequentially connected to form a sealed structure. In this manner, when the internal inspection robot moves in the liquid in a metal sealed space, the resistance to forward and backward movement may be reduced, and the stability in left and right directions is maintained, thereby improving the stability of the internal inspection robot during movement.

An embodiment of the present application provides an internal inspection robot. The internal inspection robot includes a housing, a gravity balancing apparatus, a power apparatus, and multiple sensor apparatuses. The housing is configured to be a sealed structure including a first housing and a second housing disposed opposite to each other, a third housing and a fourth housing disposed opposite to each other, and a fifth housing and a sixth housing disposed opposite to each other that are connected sequentially. The first housing and the second housing are both configured to be rectangular housings. The third housing and the fourth housing are both configured to be circular-arc housings. The fifth housing and the sixth housing are both configured to be ellipse-like housing. The gravity balancing apparatus is disposed inside the housing and configured to control the pose of the internal inspection robot. The power apparatus and the multiple sensor apparatuses are disposed on the surface of the housing. The power apparatus is configured to receive a motion control signal from a control terminal to drive the internal inspection robot to move. The multiple sensor apparatuses are configured to provide a sensing signal to the control terminal.

Unless it is explicitly stated that there is a sequence of execution between different operations shown in the flowchart in the embodiments of the present application, or there is a sequence of execution between different operations in technical implementation, otherwise, the execution sequence between multiple operations may not be prioritized, and multiple operations may also be executed simultaneously.

According to an embodiment of the present application, the internal inspection robot includes a housing, a gravity balancing apparatus disposed inside the housing, and a power apparatus and multiple sensor apparatuses disposed on the surface of the housing.

According to this embodiment of the present application, the gravity balancing apparatus is configured to control the pose change of the internal inspection robot. The power apparatus is configured to receive a motion control signal from a control terminal to drive the internal inspection robot to move. The sensor apparatuses are configured to provide a sensing signal to the control terminal. A sensor apparatus may include a visual apparatus, a positioning apparatus, a ranging apparatus, and an obstacle avoidance apparatus.

According to this embodiment of the present application, the housing of the internal inspection robot includes a first housing and a second housing disposed opposite to each other, a third housing and a fourth housing disposed opposite to each other, and a fifth housing and a sixth housing disposed opposite to each other. The first housing and the second housing are both configured to be rectangular housings. The third housing and the fourth housing are both configured to be circular-arc housings. The fifth housing and the sixth housing are both configured to be ellipse-like housing.

Figure 1:
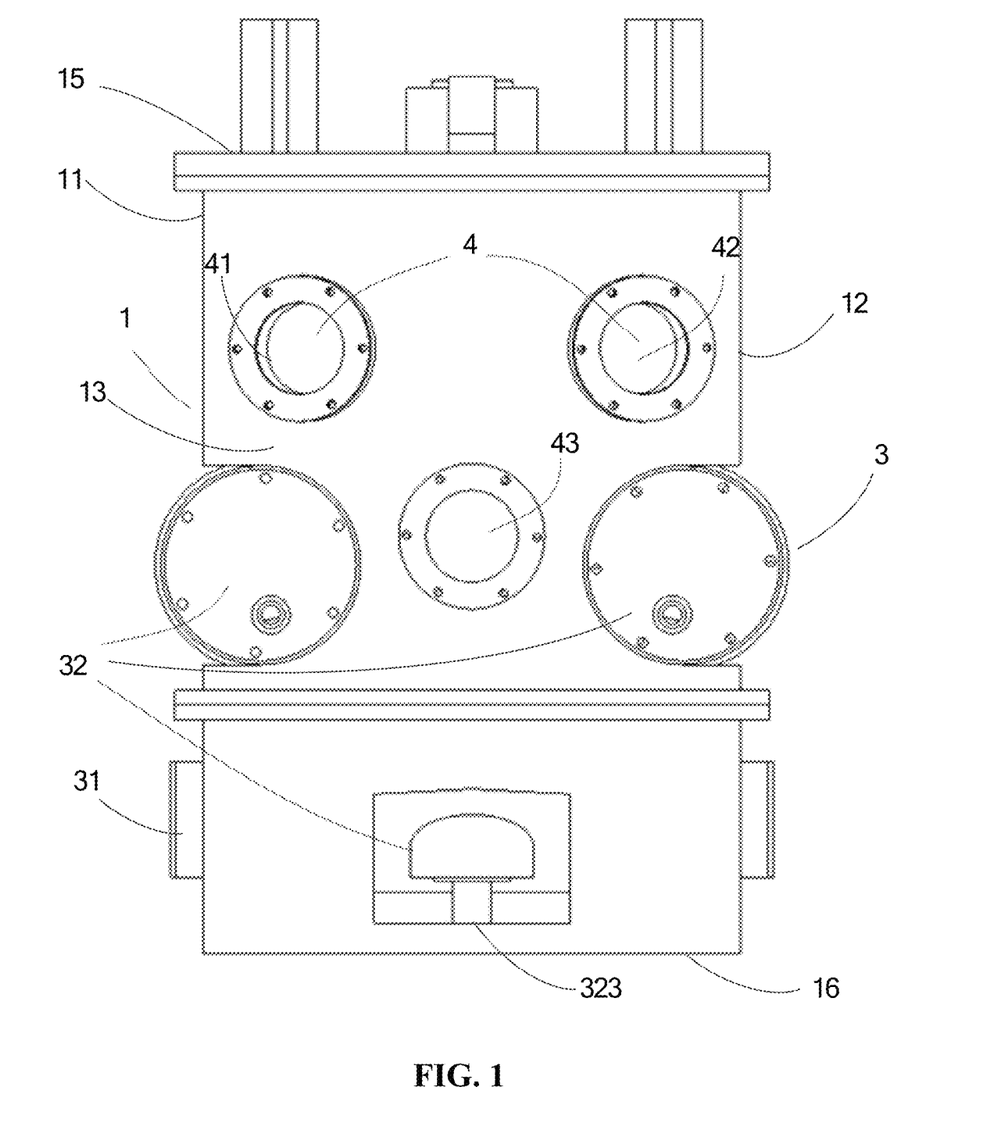
FIG. 1 is a front view of an internal inspection robot according to an embodiment of the present application.
Figure 2:
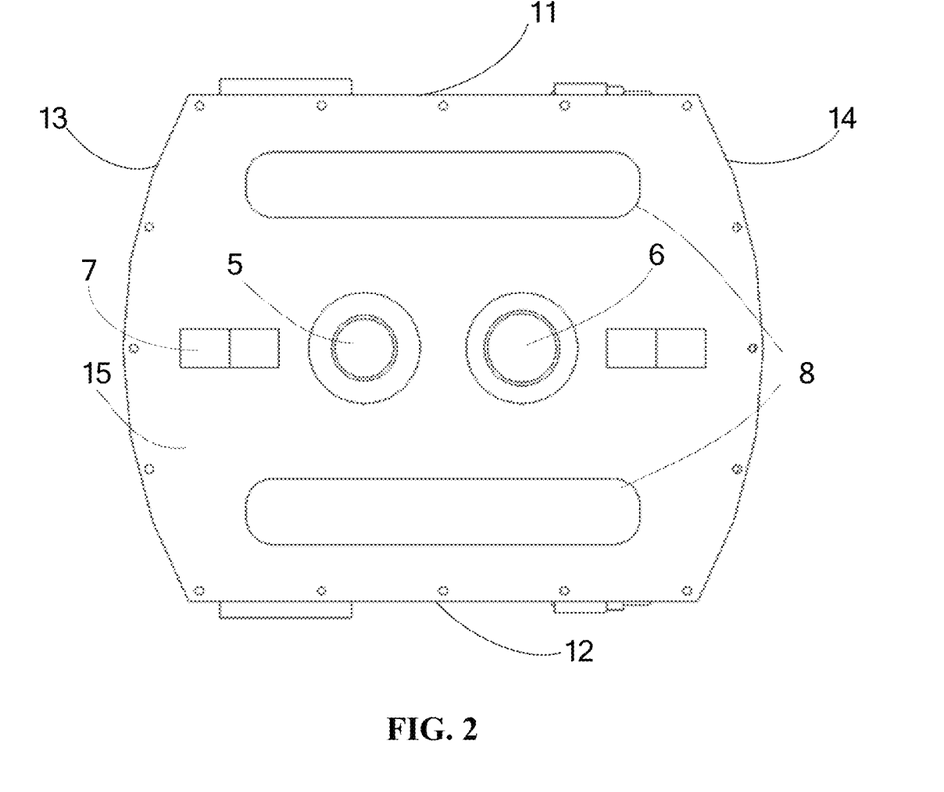
FIG. 2 is a top view of the internal inspection robot according to an embodiment of the present application.

Referring to FIG. 1 to FIG. 2, the internal inspection robot may be described below in conjunction with embodiments.

FIG. 1 is a front view of an internal inspection robot according to an embodiment of the present application.

As shown in the front view of the internal inspection robot in FIG. 1, the housing 1 of the internal inspection robot includes a first housing 11, a second housing 12, and a sixth housing 16. The first housing 11, the second housing 12, and the sixth housing 16 are provided with power apparatuses 3 respectively.

FIG. 2 is a top view of an internal inspection robot according to an embodiment of the present application.

As shown in the top view of the internal inspection robot in FIG. 2, the housing 1 of the internal inspection robot also includes a third housing 13, a fourth housing 14, and a fifth housing 15. A sounding apparatus 5, a positioning signal transmitting apparatus 6, and an infrared obstacle avoidance apparatus 7 may be disposed on the surface of the fifth housing 15.

As shown in FIG. 2, the first housing 11 and the second housing 12 are configured to be rectangular housings. The third housing 13 and the fourth housing 14 are configured to be circular-arc housings. The first housing 11 and the second housing 12 may be left and right housings of the internal inspection robot. The third housing 13 and the fourth housing 14 may be front and rear housings of the internal inspection robot.

According to this embodiment of the present application, the fifth housing 15 and the sixth housing 16 are configured to be ellipse-like housing. The fifth housing 15 and the sixth housing 16 may be top and bottom housings of the internal inspection robot.

According to this embodiment of the present application, the ellipse-like housing at the top of the internal inspection robot, that is, the fifth housing 15, the rectangular housings on the middle left and middle right sides of the internal inspection robot, that is, the first housing 11 and the second housing 12, the circular-arc housings on the middle front and middle rear sides of the internal inspection robot, that is, the third housing 13 and the fourth housing 14, and the ellipse-like housing at the bottom of the internal inspection robot, that is, the sixth housing 16, are connected in sequence from top to bottom to form a metal closed structure.

According to this embodiment of the present application, the visual apparatus 4, the sounding apparatus 5, the positioning signal transmitting apparatus 6, and the infrared obstacle avoidance apparatus 7 of the internal inspection robot are all disposed sensor apparatuses, and the sensor apparatuses may provide sensing signals to the control terminal. The visual apparatus 4 may provide an operator with the internal image information of a sealed space. The sounding apparatus 5 may be configured to accurately measure the sinking depth information of the internal inspection robot in the metal sealed space. The positioning signal transmitting apparatus 6 may be configured to provide the position information of the internal inspection robot inside the metal sealed space. The infrared obstacle avoidance apparatus 7 may be configured to provide the distance information between the internal inspection robot and an obstacle inside the transformer.

In this embodiment of the present application, for the internal inspection robot, the first housing 11 and the second housing 12 are configured to be rectangular housings, the third housing 13 and the fourth housing 14 are configured to be circular-arc housings, the fifth housing 15 and the sixth housing 16 are configured to be ellipse-like housing, and the housings are sequentially connected to form a sealed structure. In this manner, when the internal inspection robot moves in the liquid in the metal sealed space, the resistance to forward and backward movement may be reduced, and the stability in left and right directions is maintained, thereby improving the stability of the internal inspection robot during movement.

According to this embodiment of the present application, the power apparatus 3 includes a propulsion control unit and N power propulsion units, and N>2. At least two of the N power propulsion units are configured to be disposed on the first housing 11 and the second housing 12 respectively. At least one of the N power propulsion units is configured to be disposed on the fifth housing 15 or the sixth housing 16. The propulsion control unit is configured to drive the at least one of the N power propulsion units according to the motion control signal to drive the internal inspection robot of a transformer to move.

According to this embodiment of the present application, the power apparatus 3 may be configured to provide power for the internal inspection robot to perform operations such as diving, hovering, and moving forward and backward in a liquid medium. The power apparatus 3 includes at least a propulsion control unit and a power propulsion unit.

According to this embodiment of the present application, the power apparatus 3 may also include a drive motor rotation angle sensing apparatus and a drive motor rotation speed sensing apparatus and is configured to inspect the rotation angle and rotation speed of a drive motor.

According to this embodiment of the present application, the internal inspection robot is provided with at least three power propulsion units. At least two power propulsion units are configured to provide horizontal propulsion power. At least one power propulsion unit is configured to provide vertical propulsion power.

According to this embodiment of the present application, the propulsion control unit is configured to, in response to the received motion control signal, adjust the motor speed of one or more power propulsion units to drive and control the one or more power propulsion units.

Figure 3:
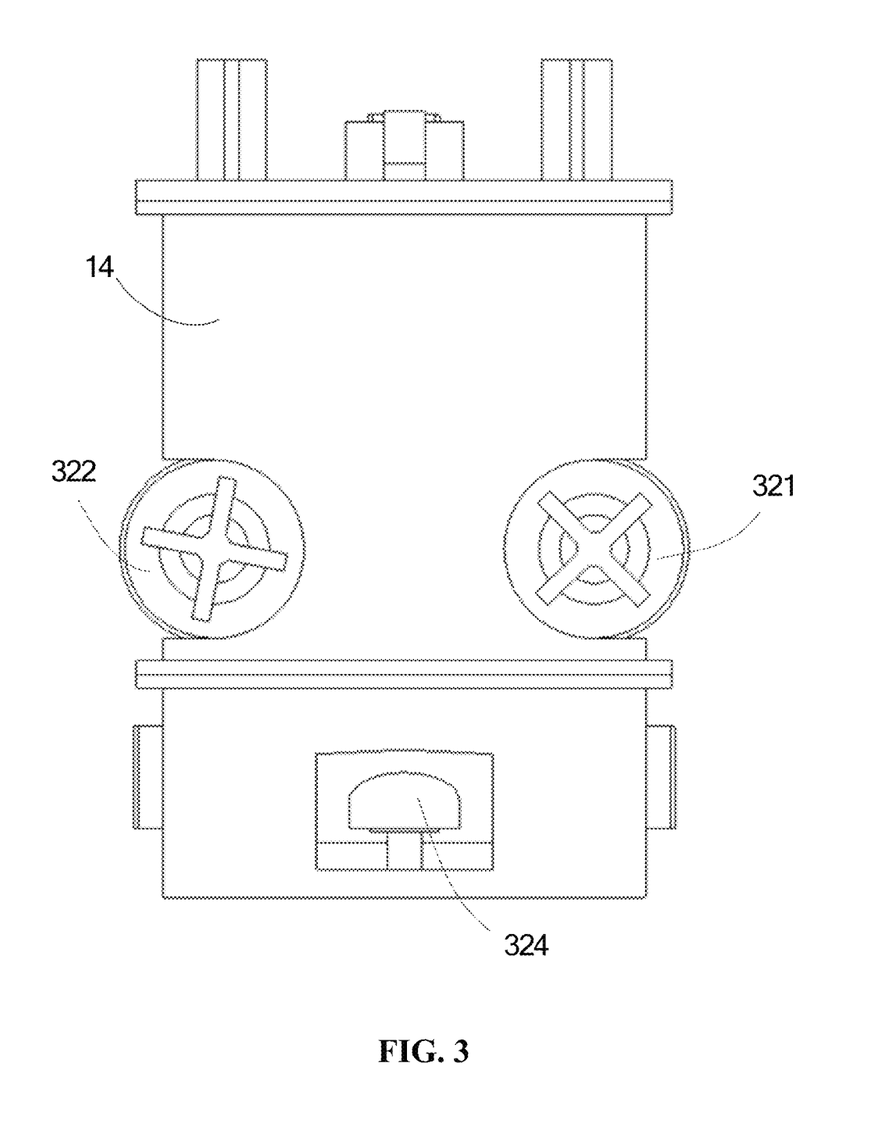
FIG. 3 is a rear view of the internal inspection robot according to an embodiment of the present application.

FIG. 3 is a rear view of an internal inspection robot according to an embodiment of the present application.

As shown in FIG. 1, in this embodiment of the present application, the power apparatus 3 includes a propulsion control unit 31 and a power propulsion unit 32. The power propulsion unit 32 includes a third power propulsion unit 323.

As shown in FIG. 3, the power propulsion unit 32 also includes a first power propulsion unit 321, a second power propulsion unit 322, and a fourth power propulsion unit 324.

Figure 4:
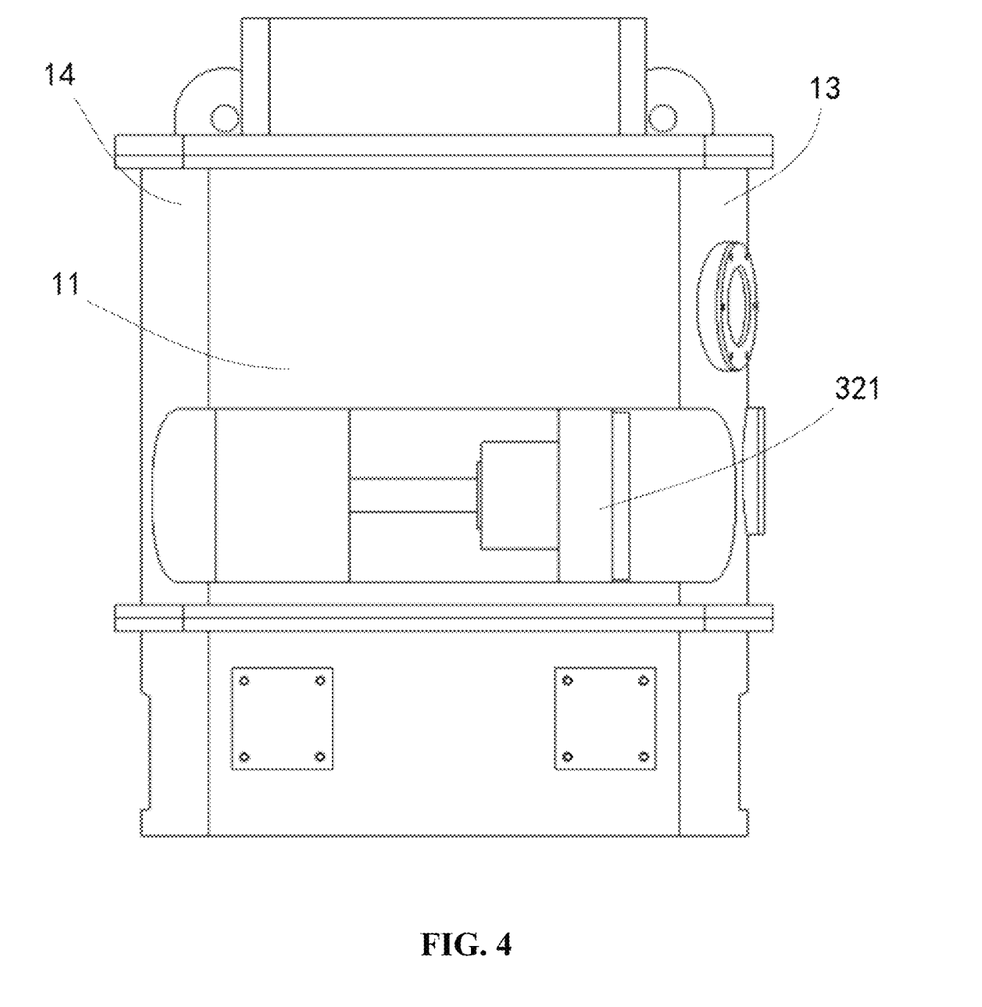
FIG. 4 is a left view of the internal inspection robot according to an embodiment of the present application.

FIG. 4 is a left view of an internal inspection robot according to an embodiment of the present application.

As shown in FIG. 4, the first power propulsion unit 321 may be disposed on the surface of the first housing 11, and similarly, the second power propulsion unit 322 may also be disposed on the surface of the second housing 12, that is, on the middle left rectangular housing and the middle right rectangular housing, and the first power propulsion unit 321 and the second power propulsion unit 322 may also be embedded in the middle part of the internal inspection robot and configured to provide horizontal propulsion power.

According to this embodiment of the present application, the third power propulsion unit 323 and the fourth power propulsion unit 324 may be mounted on the fifth housing 15 and the sixth housing 16, that is, the ellipse-like housings, and may also be embedded in the bottom part of the internal inspection robot and configured to provide vertical propulsion power. For example, as shown in FIG. 1, the third power propulsion unit 323 is mounted on the third housing 13 of the internal inspection robot.

According to this embodiment of the present application, horizontal power propellers are disposed on the first power propulsion unit 321 and the second power propulsion unit 322 respectively and configured to control the internal inspection robot to move forward and backward and turn in the liquid medium.

According to this embodiment of the present application, vertical power propellers are disposed on the third power propulsion unit 323 and the fourth power propulsion unit 324 respectively and configured to control the internal inspection robot to rise, fall, and hover in the liquid medium.

In this embodiment of the present application, the power apparatus 3 is provided with a power propulsion unit 32 and a propulsion control unit 31. The power propulsion unit 32 and the propulsion control unit 31 are configured to the optimal positions. Thus, the propulsion control unit 31 is configured to drive the power propulsion unit 32 to adjust and control the position of the internal inspection robot.

According to this embodiment of the present application, the power propulsion unit 32 also includes a sealed cabin, a propulsion motor, a bearing, a sealing member, a propeller, and a propeller guard ring. The propulsion motor is configured to be disposed in the sealed cabin. One end of the bearing is configured to be connected to the output terminal of the propulsion motor through the sealed cabin. The other end of the bearing is configured to be connected to the propeller. The sealing member is configured to be disposed at the connection between the bearing and the sealed cabin. The propeller guard ring is configured to be disposed around the propeller.

According to this embodiment of the present application, the propulsion motor may be configured to provide propulsion power for the internal inspection robot. The propulsion motor may include an alternating current induction motor, a permanent magnet alternating current synchronous motor, and a high temperature superconducting alternating current synchronous motor. The driving method of the propulsion motor may include motor speed control and motor torque control.

According to this embodiment of the present application, the propulsion motor may be disposed in the sealed cabin of the power propulsion unit 32. The sealed cabin may be configured to prevent the liquid medium from penetrating into and soaking the propulsion motor to ensure the normal operation of the propulsion motor.

According to this embodiment of the present application, the power propulsion unit 32 of the internal inspection robot may use the bearing to connect the propulsion motor and the propeller. One end of the bearing is connected to the output terminal of the propulsion motor through the sealed cabin. The other end of the bearing is connected to the propeller, so that the propulsion motor drives the propeller through the bearing.

According to this embodiment of the present application, sealing members are disposed at the connection between the bearing and the sealed cabin and at the connection between the bearing and the propeller respectively. A sealing member may be configured to implement the sealing effect of the sealed cabin, the bearing, and the propeller. The sealing member may be a ball bearing sealing ring, a felt sealing ring, and an oil sealing ring.

According to this embodiment of the present application, the propeller guard ring may be disposed around the propeller and configured to cover the propeller to prevent the internal component of the transformer from being damaged when the propeller rotates at high speed.

According to this embodiment of the present application, the multiple sensor apparatuses include a visual apparatus 4. The visual apparatus 4 includes a light source and two camera units. The light source and the two camera units are configured to be disposed on the third housing 13 or the fourth housing 14. The included angle between respective optic axes of the two camera units is configured to be 30 degrees.

According to this embodiment of the present application, the visual apparatus 4 may be configured to provide the operator with the internal image information of the sealed space. The visual apparatus 4 may include a light source and two camera units.

According to this embodiment of the present application, the light source of the visual apparatus 4 may be configured to supplement light for the camera units.

According to this embodiment of the present application, the two camera units may be configured such that the angle between the respective optic axes is 30 degrees and may be configured to capture the internal environment image of the transformer on the basis of increasing the captured field of view.

As shown in FIG. 1, the visual apparatus 4 may include a first camera unit 41, a second camera unit 42, and a light source 43.

According to this embodiment of the present application, the visual apparatus 4 may be disposed on the circular-arc housing of the front side of the middle part, that is, the third housing 13. The first camera unit 41 and the second camera unit 42 may be mounted at an angle of 30 degrees on the upper part of the third housing 13. The light source 43 may be mounted in the middle part of the third housing 13.

According to this embodiment of the present application, the light source 43 may be configured as a spotlight having high brightness and a wide angle and configured to supplement light for the first camera unit 41 and the second camera unit 42.

In this embodiment of the present application, the visual apparatus 4 disposed on the third housing 13 captures the internal environment image of the transformer, and the two camera units are configured such that the angle between the respective optic axes is 30 degrees to increase the captured field of view of the camera of the internal inspection robot.

According to this embodiment of the present application, the sounding apparatus 5 is configured to be disposed on the fifth housing 15 or the sixth housing 16 and determine the sinking depth information of the transformer internal inspection robot inside the transformer. The positioning signal transmitting apparatus 6 is configured to be disposed on the fifth housing 15 or the sixth housing 16 and transmit a positioning signal according to a preset period to enable the positioning array in the transformer to obtain the position information of the transformer internal inspection robot according to the received positioning signal. The infrared obstacle avoidance apparatus 7 includes at least two infrared sensors configured to be disposed on the fifth housing 15 or the sixth housing 16 respectively. The infrared obstacle avoidance apparatus 7 is configured to determine the distance information between the transformer internal inspection robot and the obstacle inside the transformer.

According to this embodiment of the present application, the sounding apparatus 5 may be configured to accurately measure the sinking depth information of the internal inspection robot inside the transformer and provide reference data for the hovering of the internal inspection robot. The sounding apparatus 5 may be disposed on the fifth housing 15 or the sixth housing 16.

According to this embodiment of the present application, the sounding apparatus 5 includes at least one sounding sensor. The sounding sensor 5 may be configured to sense the pressure or gravity of liquids or solids, thereby measuring the depth. The sounding sensor may include a piezoresistive sensor, a capacitive sensor, and an ultrasonic sensor.

According to this embodiment of the present application, the positioning signal transmitting apparatus 6 may be configured to transmit the positioning signal having a fixed frequency according to the preset period to enable the positioning array in the transformer to obtain the position information of the transformer internal inspection robot according to the received positioning signal. The sounding apparatus 5 may be disposed on the fifth housing 15 or the sixth housing 16.

According to this embodiment of the present application, the preset period for transmitting the positioning signal by the positioning signal transmitting apparatus 6 may be set according to conditions such as the moving distance of the internal inspection robot and the duration of entering the transformer. The positioning array for receiving the positioning signal may be configured as an ultrasonic array and an optoelectronic array.

According to this embodiment of the present application, the infrared obstacle avoidance apparatus 7 may be configured to determine the distance information between the internal inspection robot and the obstacle inside the transformer to prevent the internal inspection robot from hitting the transformer body and housing when the internal inspection robot rises and falls in the liquid medium of the transformer. The infrared obstacle avoidance apparatus 7 may be disposed on the fifth housing 15 or the sixth housing 16.

According to this embodiment of the present application, the infrared obstacle avoidance apparatus 7 includes at least two infrared sensors. The infrared sensors may use infrared light as a sounding signal and inspect an obstacle in the surrounding environment according to a reflected infrared light signal and output a voltage signal. An infrared sensor may include a thermal sensor and a photon sensor.

As shown in FIG. 2, the sounding apparatus 5 may be disposed on the top ellipse-like housing, that is, the middle left position of the fifth housing 15. The positioning signal transmitting apparatus 6 may be disposed on the top ellipse-like housing, that is, the middle right position of the fifth housing 15. The infrared obstacle avoidance apparatus 7 may be disposed on the top ellipse-like housing and the bottom ellipse-like housing, that is, the fifth housing 15 and the sixth housing 16.

According to this embodiment of the present application, the internal inspection robot also includes multiple biomimetic dorsal fin structures configured to be disposed on the fifth housing 15 or the sixth housing 16. A biomimetic dorsal fin structure is provided with a wireless control antenna and a wireless video antenna. The wireless control antenna is configured to be electrically connected to a liquid level measurement assembly 222 of an adjustment chamber, the propulsion control unit 31, a pose measurement assembly 245, the sounding apparatus 5, and the infrared obstacle avoidance apparatus 7. The wireless video antenna is configured to be electrically connected to the visual apparatus 4. The wireless control antenna is configured to receive the motion control signal from the control terminal or is configured to send liquid level information, pose information, sinking depth information, and distance information to the control terminal. The wireless video antenna is configured to transmit the image captured by the camera units of the visual apparatus 4 to the control terminal.

According to this embodiment of the present application, the internal inspection robot may be provided with multiple biomimetic dorsal fin structures. A biomimetic dorsal fin structure may be configured to coordinate the moving direction and stability of the main body of the internal inspection robot when the robot moves forward or backward by adjusting the swing of the dorsal fin.

According to this embodiment of the present application, the biomimetic dorsal fin structure may be made of an insulating material and disposed on the top ellipse-like housing and the bottom ellipse-like housing, that is, the positions of the fifth housing 15 and the sixth housing 16 protruding from the body of the internal inspection robot. Thus, it is beneficial to the transmission of a wireless signal, and the interference of the electromagnetic signal emitted by a wireless antenna on the internal control system of the robot can be reduced.

According to this embodiment of the present application, the biomimetic dorsal fin structure is provided with a wireless antenna. The wireless antenna may include a wireless control antenna and a wireless video antenna.

According to this embodiment of the present application, the wireless control antenna may be configured to be electrically connected to the liquid level measurement assembly of the adjustment chamber 222, the propulsion control unit 31, the pose measurement assembly 245, the sounding apparatus 5, and the infrared obstacle avoidance apparatus 7.

According to this embodiment of the present application, the wireless control antenna may be configured to receive the motion control signal from the control terminal and send the liquid level information, pose information, sinking depth information, and distance information to the control terminal.

According to this embodiment of the present application, the wireless video antenna may be configured to be electrically connected to the visual apparatus 4. The wireless video antenna may be configured to transmit the image captured by the camera units in the visual apparatus 4 of the internal inspection robot to the control terminal.

According to this embodiment of the present application, the internal inspection robot may also include a battery electric quantity acquisition unit, an inertial navigation unit, and a battery unit. Since the battery unit of the body of the internal inspection robot is relatively heavy, the battery unit may be mounted on the bottom ellipse-like housing of the internal inspection robot, that is, the sixth housing 16. In this manner, it is beneficial to lower the center of gravity of the internal inspection robot.

According to this embodiment of the present application, the battery electric quantity acquisition unit, the inertial navigation unit, the battery unit, a drive motor rotation angle sensing apparatus, and a drive motor rotation speed sensing apparatus may all send data information to the control terminal through the wireless control antenna.

As shown in FIG. 2, the internal inspection robot has a pair of biomimetic dorsal fin structures 8. The biomimetic dorsal fin structures may be disposed on the circular-arc housing at the top of the body of the internal inspection robot, that is, the surface of the fifth housing 15.

According to this embodiment of the present application, the gravity balancing apparatus 2 includes a gravity adjustment chamber, a liquid level control unit of the gravity adjustment chamber, a gravity balancing hammer, and a pose control unit. The gravity adjustment chamber is configured to provide a cavity structure. The cavity structure is configured to store a liquid medium. The liquid medium is the protective medium inside the transformer. The liquid level control unit of the gravity adjustment chamber is configured to suck the liquid medium from the inside of the transformer and store the liquid medium in the cavity structure or is configured to discharge the liquid medium from the cavity structure to the inside of the transformer to control the gravity of the transformer internal inspection robot. The pose control unit is configured to adjust the position of the gravity balancing hammer to control the pose of the transformer internal inspection robot.

According to this embodiment of the present application, the gravity adjustment chamber may be configured to provide the cavity structure. The cavity structure may be configured to store the liquid medium. The liquid medium may be configured to represent the insulation protection medium inside the transformer. The liquid medium has good isolation and transient response capability and can effectively protect a coil winding during overvoltage. The liquid medium may be quartz oil, environmentally friendly liquid, and fluoride liquid.

According to this embodiment of the present application, the liquid level control unit of the gravity adjustment chamber may be configured to suck the liquid medium from the inside of the transformer and store the liquid medium in the cavity structure and may also be configured to discharge the liquid medium from the cavity structure to the inside of the transformer. The volume of the liquid medium in the cavity structure is changed to adjust the gravity of the internal inspection robot.

According to this embodiment of the present application, the pose control unit may be configured to adjust the position of the gravity balancing hammer to control the pose of the internal inspection robot. For example, in the case where the center of gravity of the internal inspection robot is offset, the gravity balancing hammer may be controlled to swing in a direction opposite to the offset direction to balance the center of gravity of the body of the internal inspection robot.

Figure 5:
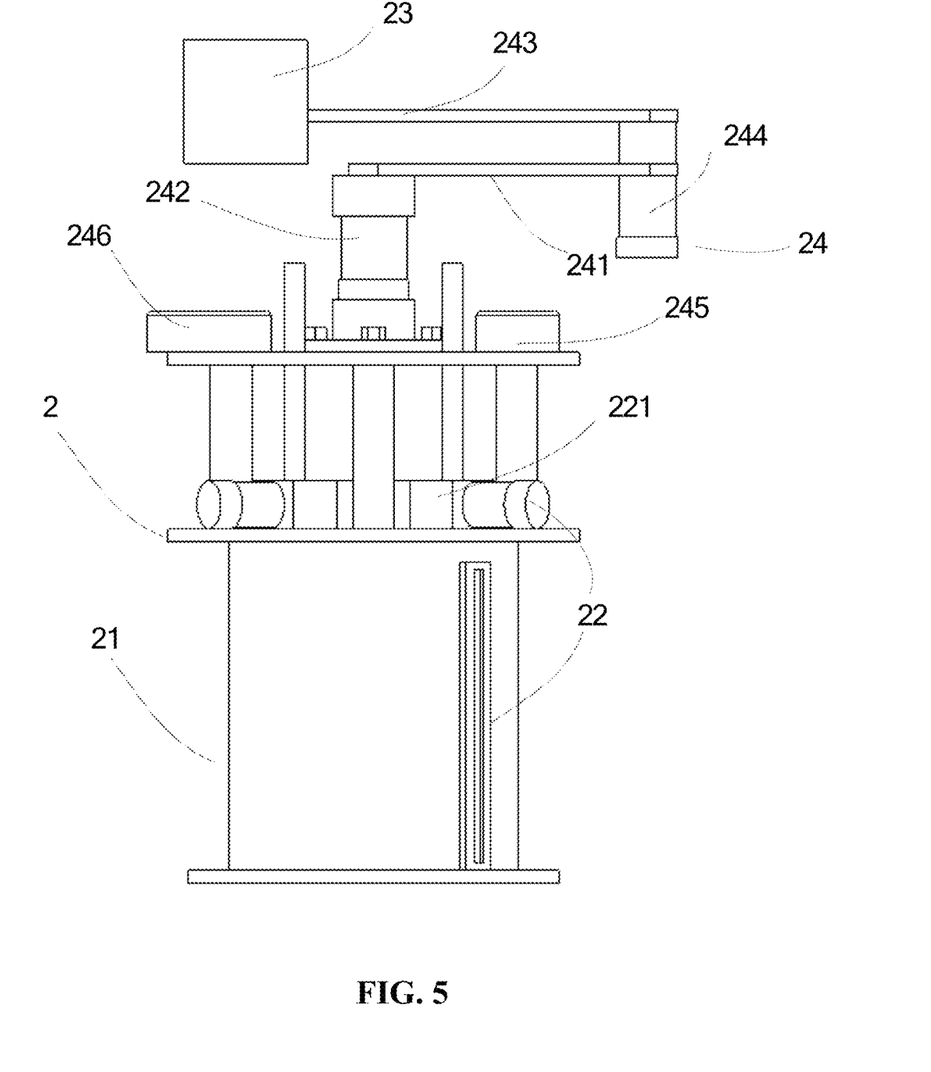
FIG. 5 is a plan view of a gravity balancing apparatus of the internal inspection robot according to an embodiment of the present application.

FIG. 5 is a plan view of a gravity balancing apparatus of the internal inspection robot according to an embodiment of the present application.

As shown in FIG. 5, the gravity balancing apparatus 2 is disposed inside the housing 1 of the internal inspection robot. The gravity balancing apparatus 2 includes a gravity adjustment chamber 21, a liquid level control unit 22 of the gravity adjustment chamber, a gravity balancing hammer 23, and a pose control unit 24. The gravity adjustment chamber 21 is disposed at the lower part of the gravity balancing apparatus 2. The liquid level control unit 22 of the gravity adjustment chamber is disposed outside the gravity adjustment chamber 21 and in the middle of the gravity balancing apparatus 2. One end of the pose control unit 24 is connected to the gravity balancing hammer 23, and the other end of the pose control unit 24 is connected to the liquid level control unit 22 of the gravity adjustment chamber.

In this embodiment of the present application, the gravity balancing apparatus 2 is disposed inside the housing 1 of the internal inspection robot. The center of gravity and the pose of the internal inspection robot are adjusted through the gravity adjustment chamber 21, the liquid level control unit 22 of the gravity adjustment chamber, the gravity balancing hammer 23, and the pose control unit 24, thereby improving the stability and maneuverability of the internal inspection robot.

According to this embodiment of the present application, the gravity adjustment chamber 21 includes an adjustment chamber housing and an adjustment chamber piston. The adjustment chamber piston includes a piston top and multiple piston connecting rods. Ends of the multiple piston connecting rods are configured to be connected to the piston top. The piston top and the adjustment chamber housing are sealed and connected to form the cavity structure.

Figure 6:
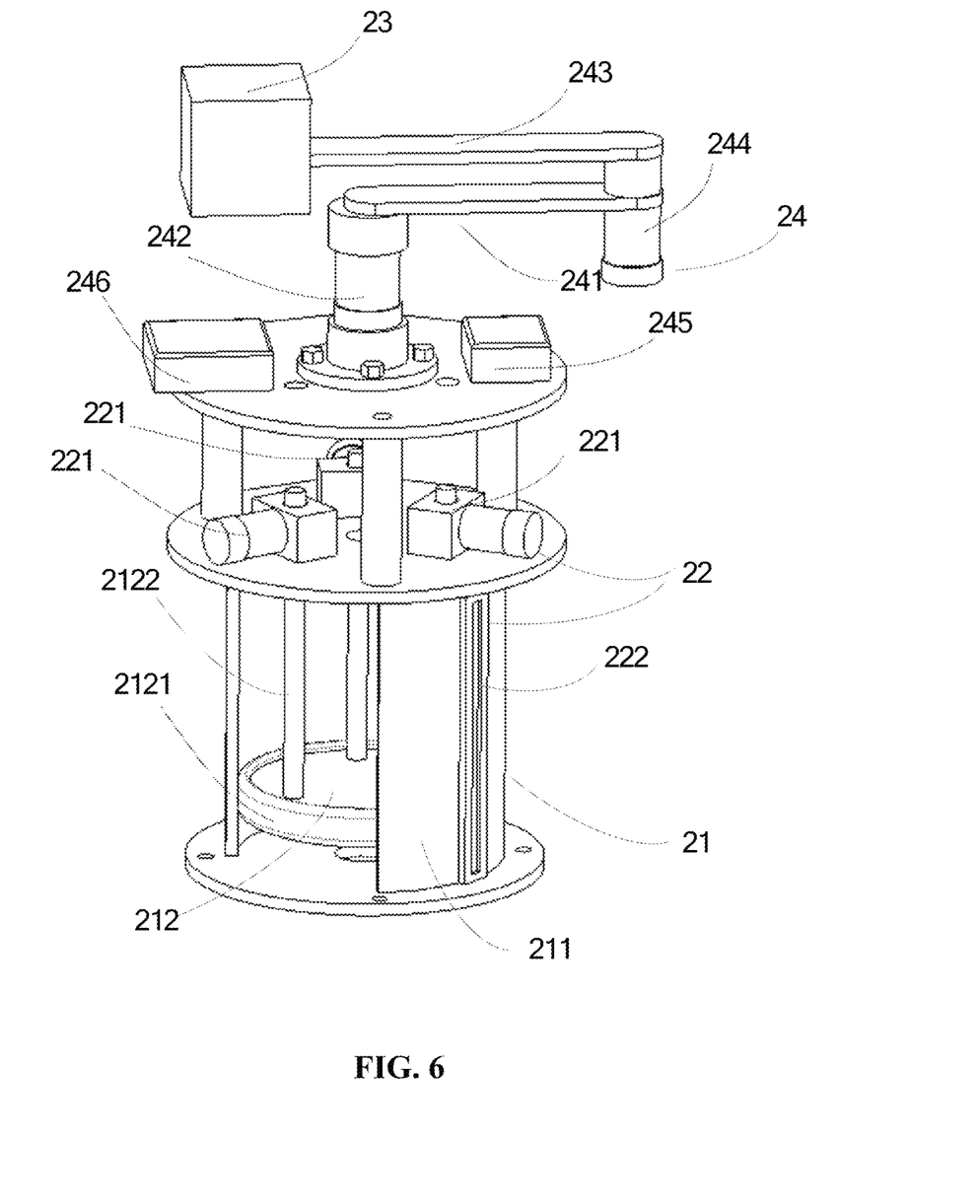
FIG. 6 is a view illustrating the structure of the gravity balancing apparatus of the internal inspection robot according to an embodiment of the present application.

FIG. 6 is a view illustrating the three-dimensional structure of the gravity balancing apparatus of the internal inspection robot according to an embodiment of the present application.

As shown in FIG. 6, the gravity adjustment chamber 21 includes an adjustment chamber housing 211 and an adjustment chamber piston 212. The adjustment chamber piston 212 includes a piston top 2121 and piston connecting rods 2122.

According to this embodiment of the present application, the number of piston connecting rods 2122 is set according to actual requirements and the size of the gravity adjustment chamber 21. This is not limited in this embodiment. Ends of the piston connecting rods 2122 are configured to be connected to the piston top 2121. From top to bottom, the piston top 2121, the piston connecting rods 2122, and the adjustment chamber housing 211 are sealed and connected in sequence to form the cavity structure of the gravity adjustment chamber 21.

According to this embodiment of the present application, the piston top 2121 and the adjustment chamber housing 211 of the gravity adjustment chamber 21 are configured to be sealed and connected to form the cavity structure. The liquid medium is sucked from the inside of the transformer and stored in the cavity structure. Alternatively, the liquid medium is discharged from the cavity structure to the inside of the transformer. In this manner, the volume of the liquid medium in the cavity structure is changed to adjust the gravity of the internal inspection robot, thereby improving the balance stability of the body of the internal inspection robot.

According to this embodiment of the present application, the liquid level control unit 22 of the gravity adjustment chamber includes multiple piston lifting assemblies, a liquid level control assembly, and a liquid level measurement assembly. The multiple piston lifting assemblies are configured to be connected to the other ends of the multiple piston connecting rods 2122 respectively. The liquid level measurement assembly is configured to determine the liquid level information of the liquid medium stored in the cavity structure. The liquid level control assembly is configured to control the multiple piston lifting assemblies to drive the multiple piston connecting rods 2122 to move in a direction parallel to the piston connecting rods 2122 according to the liquid level information to adjust the position of the piston top 2121, control the volume of the cavity structure, and suck or discharge the liquid medium.

According to this embodiment of the present application, the piston lifting assemblies may be configured to synchronously lift the piston connecting rods 2122 to lift the adjustment chamber piston 212 to prevent the piston from deflecting when the adjustment chamber piston 212 is lifted, which leads to the leakage of the liquid medium, such as oil, from the cavity to the outside of the cavity, thereby avoiding problems such as the instability in the operation of the internal inspection robot.

According to this embodiment of the present application, the liquid level measurement assembly may be configured to measure the liquid level information of the liquid medium sucked into or discharged from the cavity structure by the adjustment chamber piston 212.

According to this embodiment of the present application, the liquid level control unit 22 of the gravity adjustment chamber also includes a liquid level control assembly. The liquid level control assembly may be configured to control the multiple piston lifting assemblies to drive the multiple piston connecting rods 2122 to move in the direction parallel to the piston connecting rods 2122 according to the liquid level information acquired by the liquid level measurement assembly to adjust the position of the piston top 2121, thereby controlling the volume of the cavity structure to suck or discharge the liquid medium.

As shown in FIG. 6, the liquid level control unit 22 of the gravity adjustment chamber includes a piston lifting assembly 221, a liquid level control assembly, and a liquid level measurement assembly 222.

According to this embodiment of the present application, multiple piston lifting assemblies 221 may be disposed in the liquid level control unit 22 of the gravity adjustment chamber. The piston lifting assemblies 221 and the other ends of the multiple piston connecting rods 2122 are sealed and connected. The liquid level measurement assembly 222 may be disposed outside the adjustment chamber housing 211 and configured to measure the liquid level of the liquid medium sucked into or discharged from the cavity structure.

In this embodiment of the present application, the liquid level control unit 22 of the gravity adjustment chamber accurately controls the liquid level of the sucked or discharged liquid medium and may further accurately control and adjust the gravity of the internal inspection robot, so that the gravity and the buoyancy of the internal inspection robot are close, thereby saving the electric quantity consumed by the internal inspection robot when the internal inspection robot rises, falls, and hovers in the transformer oil.

According to this embodiment of the present application, the pose control unit 24 includes a first mechanical arm, a second mechanical arm, a first mechanical arm drive joint, a second mechanical arm drive joint, a pose measurement assembly, and a pose control assembly. The first mechanical arm drive joint, the first mechanical arm, the second mechanical arm drive joint, and the second mechanical arm are configured to be connected in sequence. The end of the second mechanical arm facing away from the second mechanical arm drive joint is configured to be connected to the gravity balancing hammer 23. The pose measurement assembly is configured to determine the pose information of the transformer internal inspection robot. The pose control assembly is configured to control rotation of the first mechanical arm drive joint and the second mechanical arm drive joint according to the pose information to drive the first mechanical arm and the second mechanical arm to move and adjust the position of the gravity balancing hammer 23 to control the pose of the transformer internal inspection robot.

According to this embodiment of the present application, the pose measurement assembly may be configured to measure the tilt angle and the tilt direction of the body of the internal inspection robot to determine the pose information of the internal inspection robot.

According to this embodiment of the present application, the pose measurement assembly may be configured to control rotation of the first mechanical arm drive joint and the second mechanical arm drive joint according to the pose information fed back by the pose measurement assembly, thereby adjusting the position of the gravity balancing hammer 23 through the first mechanical arm and the second mechanical arm.

As shown in FIG. 6, the pose control unit 24 includes a first mechanical arm 241, a first mechanical arm drive joint 242, a second mechanical arm 243, a second mechanical arm drive joint 244, a pose measurement assembly 245, and a pose control assembly 246.

According to this embodiment of the present application, the first mechanical arm drive joint 242, the first mechanical arm 241, the second mechanical arm drive joint 244, and the second mechanical arm 243 are configured to be connected in sequence.

For example, one end of the first mechanical arm 241 is connected to the first mechanical arm drive joint 242, and the other end of the first mechanical arm 241 facing away from the first mechanical arm drive joint 242 is connected to the second mechanical arm drive joint 244. One end of the second mechanical arm 243 is connected to the second mechanical arm drive joint 244, and the end of the second mechanical arm 243 facing away from the second mechanical arm drive joint 244 is connected to the gravity balancing hammer 23.

According to this embodiment of the present application, the pose measurement assembly 245 and the pose control assembly 246 may be mounted on a platform that fixes the first mechanical arm drive joint 242.

According to this embodiment of the present application, the drive motor may be configured to drive a mechanical arm drive joint to drive a mechanical arm to rotate. A speed reducer may be configured to mesh a gear having fewer teeth on an input shaft with a larger gear on an output shaft to reduce the speed of the motor. A rotation axis angle measurement apparatus may be configured to measure the rotation angle information of the mechanical arm drive joint and the mechanical arm.

Figure 7:
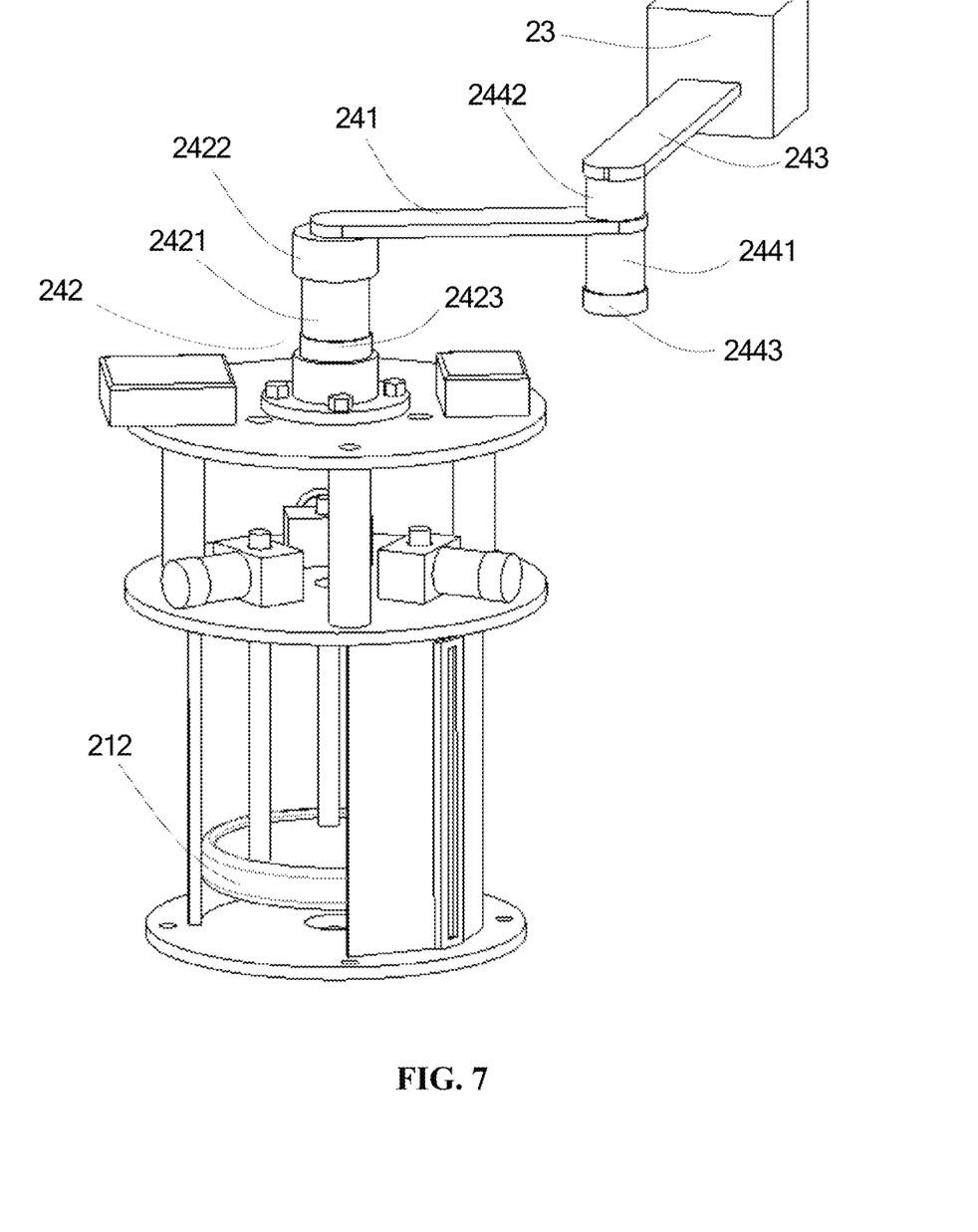
FIG. 7 is a view of a pose control structure of the internal inspection robot according to an embodiment of the present application.

FIG. 7 is a view of a pose control structure of the internal inspection robot according to an embodiment of the present application.

As shown in FIG. 7, the first mechanical arm drive joint 242 may also include a first drive motor 2421, a first speed reducer 2422, and a first rotation axis angle measurement apparatus 2423. The second mechanical arm drive joint 244 may also include a second drive motor 2441, a second speed reducer 2442, and a second rotation axis angle measurement apparatus 2443. The first rotation axis angle measurement apparatus 2423 is mounted on a fixed platform. The first rotation axis angle measurement apparatus 2423, the first drive motor 2421, and the first speed reducer 2422 are connected in sequence from bottom to top. One end of the first mechanical arm 241 is connected to the first speed reducer 2422, and the other end of the first mechanical arm 241 is connected to the second drive motor 2441 and the second speed reducer 2442. The second drive motor 2441 is connected to the second rotation axis angle measurement apparatus 2443. One end of the second mechanical arm 243 is connected to the second speed reducer 2442.

In this embodiment of the present application, the pose measurement assembly 245 measures the tilt angle and the tilt direction of the body of the internal inspection robot. The pose control assembly 246 is configured to control rotation of the first mechanical arm drive joint 242 and the second mechanical arm drive joint 244 according to the pose information fed back by the pose measurement assembly 245 to drive the first mechanical arm 241 and the second mechanical arm 243 to move and adjust the position of the gravity balancing hammer 23. Thus, the tilt of the body of the internal inspection robot due to the offset of the center of gravity is compensated, so that the pose control of the internal inspection robot is implemented, and the movement stability of the internal inspection robot is improved.

According to this embodiment of the present application, referring to FIG. 1 to FIG. 7, the operating principle of the internal inspection robot may be described below in conjunction with embodiments.

According to this embodiment of the present application, the housing 1 of the body of the internal inspection robot is configured such that the first housing 11 and the second housing 12 are configured to be rectangular housings, and the third housing 13 and the fourth housing 14 are configured to be circular-arc outer housings. For this structure, when the internal inspection robot moves in the liquid medium, it is beneficial to reduce the resistance to forward and backward movement, the stability of the body of the internal inspection robot is maintained, and at the same time, the operability of the coordinated movement direction is improved.

According to this embodiment of the present application, a pair of biomimetic dorsal fin structures are disposed on the fifth housing 15 and the sixth housing 16 of the internal inspection robot. The biomimetic dorsal fin structures 8 enable the internal inspection robot to coordinate the movement of the internal inspection robot in the liquid medium of the transformer in the forward and backward directions by swinging.

According to this embodiment of the present application, the sounding apparatus 5 and the positioning signal transmitting apparatus 6 are disposed on the fifth housing 15 and the sixth housing 16 of the internal inspection robot. The sounding apparatus 5 is configured to accurately sound the sinking depth information of the internal inspection robot in the liquid medium of the transformer and control the hovering of the internal inspection robot according to the data. The positioning signal transmitting apparatus 6 sends a positioning signal having a fixed frequency at regular intervals. After the positioning signal is received by the positioning array in the liquid medium of the transformer, the positioning signal is used for acquiring the position information of the internal inspection robot.

According to this embodiment of the present application, two power propulsion units 32 may be embedded in the middle part of the internal inspection robot and configured to provide horizontal propulsion power to control the internal inspection robot to move forward and backward and turn. One or more power propulsion units 32 may be embedded in the bottom of the internal inspection robot and configured to provide vertical propulsion power to control the internal inspection robot to rise, fall, and hover in the liquid medium of the transformer.

According to this embodiment of the present application, a gravity balancing apparatus 2 is mounted inside the internal inspection robot. The gravity balancing apparatus 2 may adjust the gravity of the internal inspection robot, so that the gravity and the buoyancy of the internal inspection robot are close, thereby saving the electric quantity consumed by the internal inspection robot when the internal inspection robot rises, falls, and hovers in the liquid medium of the transformer. The gravity balancing apparatus 2 may also adjust the pose of the internal inspection robot. Thus, the tilt of the body of the internal inspection robot due to the offset of the center of gravity is avoided.

According to this embodiment of the present application, the infrared obstacle avoidance apparatus 7 may be mounted on the fifth housing 15 and the sixth housing 16 of the internal inspection robot and configured to determine the distance information between the internal inspection robot and the obstacle inside the transformer to prevent the internal inspection robot from hitting the transformer body and housing when the internal inspection robot rises and falls in the liquid medium of the transformer.

According to this embodiment of the present application, the visual apparatus 4 may be mounted on the upper part of the third housing 13 and the fourth housing 14 of the internal inspection robot. The camera unit of the visual apparatus 4 is configured such that the angle between the respective optic axes is 30 degrees and may be configured to capture the internal environment image of the transformer on the basis of increasing the captured field of view.

According to this embodiment of the present application, the light source 43 may be mounted in the middle of the third housing 13 and the fourth housing 14 of the internal inspection robot, such as a spotlight having high brightness and a wide angle, and configured to supplement light for the camera unit. The visual apparatus 4 continuously captures the internal environment of a large transformer, transmits the captured images to the receiving antenna at the mounting hole of the transformer body through the wireless video antenna, and then uploads the images to the computer workstation, so that the internal inspection robot can perform more intuitive inspection and fault diagnosis on the internal devices of the transformer.

Unless it is explicitly stated that there is a sequence of execution between different operations shown in the flowchart in the embodiments of the present application, or there is a sequence of execution between different operations in technical implementation, otherwise, the execution sequence between multiple operations may not be prioritized, and multiple operations may also be executed simultaneously.

Features described in multiple embodiments and/or claims of the present application may be combined or/and coupled in various ways, even if such combinations or couplings are not explicitly described in the present application. Features described in multiple embodiments and/or claims of the present application may be combined and/or coupled in various ways. All the combinations and/or couplings fall within the scope of the present application.

What is claimed is:

1. An internal inspection robot, comprising:
   a housing configured to be a sealed structure comprising a first housing and a second housing disposed opposite to each other, a third housing and a fourth housing disposed opposite to each other, and a fifth housing and a sixth housing disposed opposite to each other that are connected sequentially, wherein the first housing and the second housing are each configured to be a rectangular housing, the third housing and the fourth housing are each configured to be a circular-arc housing, and the fifth housing and the sixth housing are each configured to be an ellipse-like housing;

a gravity balancing apparatus disposed inside the housing and configured to control a pose of the internal inspection robot, the gravity balancing apparatus comprising a gravity adjustment chamber, a liquid level control unit of the gravity adjustment chamber, a gravity balancing hammer, and a pose control unit, wherein the gravity adjustment chamber is configured to provide a cavity structure, the cavity structure is configured to store a liquid medium, and the liquid medium is a protective medium inside a transformer;

the liquid level control unit of the gravity adjustment chamber is configured to suck the liquid medium from an inside of the transformer and store the liquid medium in the cavity structure or is configured to discharge the liquid medium from the cavity structure to the inside of the transformer to control gravity of the internal inspection robot; and the pose control unit is configured to adjust a position of the gravity balancing hammer to control the pose of the internal inspection robot; and a power apparatus and a plurality of sensor apparatuses disposed on a surface of the housing, wherein the power apparatus comprises a propulsion control unit configured to receive a motion control signal from a control terminal to drive the internal inspection robot to move, and a sensor apparatus of the plurality of sensor apparatuses is configured to provide a sensing signal to the control terminal.

2. The internal inspection robot according to claim 1, wherein the gravity adjustment chamber comprises an adjustment chamber housing and an adjustment chamber piston, the adjustment chamber piston comprises a piston top and a plurality of piston connecting rods, ends of the plurality of piston connecting rods are configured to be connected to the piston top, and the piston top and the adjustment chamber housing are sealed and connected to form the cavity structure.

3. The internal inspection robot according to claim 2, wherein the liquid level control unit of the gravity adjustment chamber comprises a plurality of piston lifting assemblies, a liquid level control assembly, and a liquid level measurement assembly, wherein each of the plurality of piston lifting assemblies is configured to be connected to the other end of a respective one of the plurality of piston connecting rods;

the liquid level measurement assembly is configured to determine liquid level information of the liquid medium stored in the cavity structure; and the liquid level control assembly is configured to, according to the liquid level information, control the plurality of piston lifting assemblies to drive the plurality of piston connecting rods to move in a direction parallel to the plurality of piston connecting rods to adjust a position of the piston top, control a volume of the cavity structure, and suck or discharge the liquid medium.

4. The internal inspection robot according to claim 1, wherein the pose control unit comprises a first mechanical arm drive joint, a first mechanical arm, a second mechanical arm drive joint, a second mechanical arm that are connected in sequence, a pose measurement assembly, and a pose control assembly, wherein, an end of the second mechanical arm facing away from the second mechanical arm drive joint is configured to be connected to the gravity balancing hammer;

the pose measurement assembly is configured to determine pose information of the internal inspection robot; and the pose control assembly is configured to, according to the pose information, control rotation of the first mechanical arm drive joint and the second mechanical arm drive joint to drive the first mechanical arm and the second mechanical arm to move and adjust the position of the gravity balancing hammer to control the pose of the internal inspection robot.

5. The internal inspection robot according to claim 1, wherein the power apparatus further comprises N power propulsion units, wherein N>2;

at least two of the N power propulsion units are configured to be disposed on the first housing and the second housing respectively;

at least one of the N power propulsion units is configured to be disposed on the fifth housing or the sixth housing; and the propulsion control unit is further configured to, according to the motion control signal, drive the at least one of the N power propulsion units to drive the internal inspection robot to move.

6. The internal inspection robot according to claim 5, wherein a power propulsion unit of the N power propulsion units comprises a sealed cabin, a propulsion motor, a bearing, a sealing member, a propeller, and a propeller guard ring, wherein, the propulsion motor is configured to be disposed in the sealed cabin;

one end of the bearing is configured to be connected to an output terminal of the propulsion motor through the sealed cabin, and another end of the bearing is configured to be connected to the propeller;

the sealing member is configured to be disposed at a connection between the bearing and the sealed cabin; and the propeller guard ring is configured to be disposed around the propeller.

7. The internal inspection robot according to claim 1, wherein the plurality of sensor apparatuses comprise a visual apparatus, the visual apparatus comprises a light source and two camera units, and the light source and the two camera units are configured to be disposed on the third housing or the fourth housing; and an included angle between optic axes of the two camera units is configured to be 30 degrees.

8. The internal inspection robot according to claim 1, further comprising:

a plurality of biomimetic dorsal fin structures configured to be disposed on the fifth housing or the sixth housing, wherein, a biomimetic dorsal fin structure of the plurality of biomimetic dorsal fin structures is provided with a wireless control antenna and a wireless video antenna;

the wireless control antenna is configured to receive the motion control signal from the control terminal or send a plurality of sensing signals to the control terminal; and the wireless video antenna is configured to send the control terminal an image captured by the two camera units of the visual apparatus.

9. The internal inspection robot according to claim 1, wherein the plurality of sensor apparatuses comprise a sounding apparatus, a positioning signal transmitting apparatus, and an infrared obstacle avoidance apparatus, wherein, the sounding apparatus is configured to be disposed on the fifth housing or the sixth housing and determine sinking depth information of the internal inspection robot inside the transformer;

the positioning signal transmitting apparatus is configured to be disposed on the fifth housing or the sixth housing and transmit a positioning signal according to a preset period to enable a positioning array in the transformer to obtain position information of the internal inspection robot according to the received positioning signal; and the infrared obstacle avoidance apparatus comprises at least two infrared sensors configured to be disposed on the fifth housing and the sixth housing respectively, and the infrared obstacle avoidance apparatus is configured to determine distance information between the internal inspection robot and an obstacle inside the transformer.

* * * * *